(12) United States Patent
Epshtein et al.

(10) Patent No.: US 8,917,935 B2
(45) Date of Patent: Dec. 23, 2014

(54) DETECTING TEXT USING STROKE WIDTH BASED TEXT DETECTION

(75) Inventors: Boris Epshtein, Bothell, WA (US); Eyal Ofek, Redmond, WA (US); Yonatan Wexler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1234 days.

(21) Appl. No.: 12/122,729

(22) Filed: May 19, 2008

(65) Prior Publication Data

US 2009/0285482 A1    Nov. 19, 2009

(51) Int. Cl.
G06K 9/34    (2006.01)
G06K 9/32    (2006.01)
G06K 9/00    (2006.01)

(52) U.S. Cl.
CPC .......... G06K 9/3258 (2013.01); G06K 9/00463 (2013.01)
USPC ............................. 382/176; 382/195; 358/462

(58) Field of Classification Search
USPC ................................. 382/176, 195; 358/462
See application file for complete search history.

(56) References Cited

U.S. PATENT DOCUMENTS

| | | | | |
|---|---|---|---|---|
| 5,253,307 | A | * | 10/1993 | Wayner et al. ................. 382/181 |
| 5,513,277 | A | * | 4/1996 | Huttenlocher ................. 382/171 |
| 6,195,459 | B1 | * | 2/2001 | Zhu ............................... 382/176 |
| 6,289,122 | B1 | | 9/2001 | Karidi |
| 6,674,900 | B1 | | 1/2004 | Ma et al. |
| 6,842,537 | B2 | | 1/2005 | Nicolas et al. |
| 6,917,708 | B2 | * | 7/2005 | Goodman et al. ............. 382/186 |
| 7,010,166 | B2 | * | 3/2006 | Ayshi et al. ................... 382/199 |
| 7,031,553 | B2 | | 4/2006 | Myers et al. |
| 7,043,080 | B1 | | 5/2006 | Dolan |
| 7,085,420 | B2 | | 8/2006 | Mehrotra |
| 7,139,430 | B2 | | 11/2006 | Sparr et al. |
| 7,177,472 | B2 | | 2/2007 | Karidi et al. |
| 2003/0198386 | A1 | | 10/2003 | Luo |
| 2005/0201619 | A1 | | 9/2005 | Sun et al. |
| 2006/0212802 | A1 | * | 9/2006 | Wakeam et al. ............... 715/513 |
| 2007/0110322 | A1 | | 5/2007 | Yuille et al. |
| 2009/0060335 | A1 | * | 3/2009 | Rodriguez Serrano et al. ............................ 382/177 |

FOREIGN PATENT DOCUMENTS

WO    0169529 A3    2/2002

OTHER PUBLICATIONS

Pervouchine et al.; "Document examiner feature extraction: thinned vs. skeletonised handwriting images"; IEEE Region 10/TENCON Nov. 21-24, 2005; pp. 1-6.*

Ezaki et al.; "Text detection from natural scene images: towards a system for visually impaired persons"; IEEE proc. of 17th Intl. Conf Pattern Recognition; vol. II Aug. 2004.*

(Continued)

*Primary Examiner* — Chan Park
*Assistant Examiner* — Eueng-Nan Yeh
(74) *Attorney, Agent, or Firm* — Steve Spellman; Jim Ross; Micky Minhas

(57) ABSTRACT

Detecting text using stroke width based text detection. As a part of the text detection, a representation of an image is generated that includes pixels that are associated with the stroke widths of components of the image. Connected components of the image are identified by filtering out portions of the pixels using metrics related to stroke width. Text is detected in the image based on the identified connected components.

24 Claims, 11 Drawing Sheets

(56) References Cited

OTHER PUBLICATIONS

Ezaki, et al., "Text Detection from Natural Scene Images: Towards a System for Visually Impaired Persons", Proceedings of 17th International Conference on Pattern Recognition (ICPR 2004), IEEE Computer Society, 2004, Cambridge, UK, vol. II, Dated: Aug. 23-26, pp. 683-686.

Huynh, "Automatic Text Detection in Complex Background Images", Curtin, University of Technology, Dated: Oct. 31, 2003, 117 Pages.

* cited by examiner

DETECTING TEXT USING STROKE WIDTH BASED TEXT DETECTION

BACKGROUND

The ability to easily capture and store digital photographs have made digital photographs a valuable source of information. One area where such digital photographs have proven to be a valuable resource is in text detection. Text detection systems employ text detection algorithms. Text detection algorithms are used to identify areas in images such as street sides that are most likely to contain text. The identified areas can then be processed by a text recognition algorithm (OCR). There are two advantages to using text detection prior to OCR. First, because conventional OCR algorithms are typically slow, it is computationally advantageous to identify areas that are likely to contain text so as to reduce the areas that the text recognition algorithm has to process such that its computational workload is likewise reduced. Second, identifying areas that are likely to contain text enables the pruning out of areas that do not contain text, which can reduce the error rate of an OCR algorithm.

In some applications text detection can be beneficial even where there is no need to actually recognize the text. For example, as a part of the texturing of building models for services such as Microsoft Virtual Earth™, there can be a need to stitch several ground-level images into one unified texture to model a building façade. When doing so, it is beneficial to avoid stitching the images in the areas that include text (such as shops signs), in order to prevent the generation of unreadable text in the final texture.

Accordingly, detecting text in natural scenes (as opposed to scans of book pages, faxed documents, and business cards) is an important step for a number of applications. Other applications where such functionality can be vital include computerized aids for visually impaired persons, precise and automatic geo-coding of businesses, automatic navigation in urban environments, recognition of goods on store shelves, and the like.

Natural images can include components that have a wide range of text fonts, language types, colors and illumination changes. Some conventional systems that are used to detect text in natural images rely on particular color contrast, horizontal and vertical features, windows of expected pixel height and boundaries. Because of their reliance on such parameters, where a natural image includes the aforementioned wide range of text fonts, language types, colors and/or illumination changes, the reliable detection of text can prove problematic. Consequently, many conventional systems produce a large number of false detections (e.g., false positive detections) and are thus inadequate for many text detection applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Many conventional systems for detecting text in images rely on particular color contrast, horizontal and vertical features, windows of expected pixel height and boundaries in the detection of text. Because of their reliance on such parameters, where an image (such as natural images) includes a wide range of text fonts, language types, colors and/or illumination changes, a reliable detection of text therein can be problematic. A methodology for detecting text in images using stroke width based text detection is disclosed that reliably detects text in images that include a wide range of text fonts, language types, colors and/or illumination changes. As a part of the text detection methodology disclosed, a representation of an image is generated that includes elements, such as pixels, that are associated with a stroke width. Connected components of the image are identified by filtering out portions of the elements using metrics related to stroke width such as the standard deviation of the stroke width of the connected component with which the elements are associated. Text is detected in the image based on the identified connected components.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1:
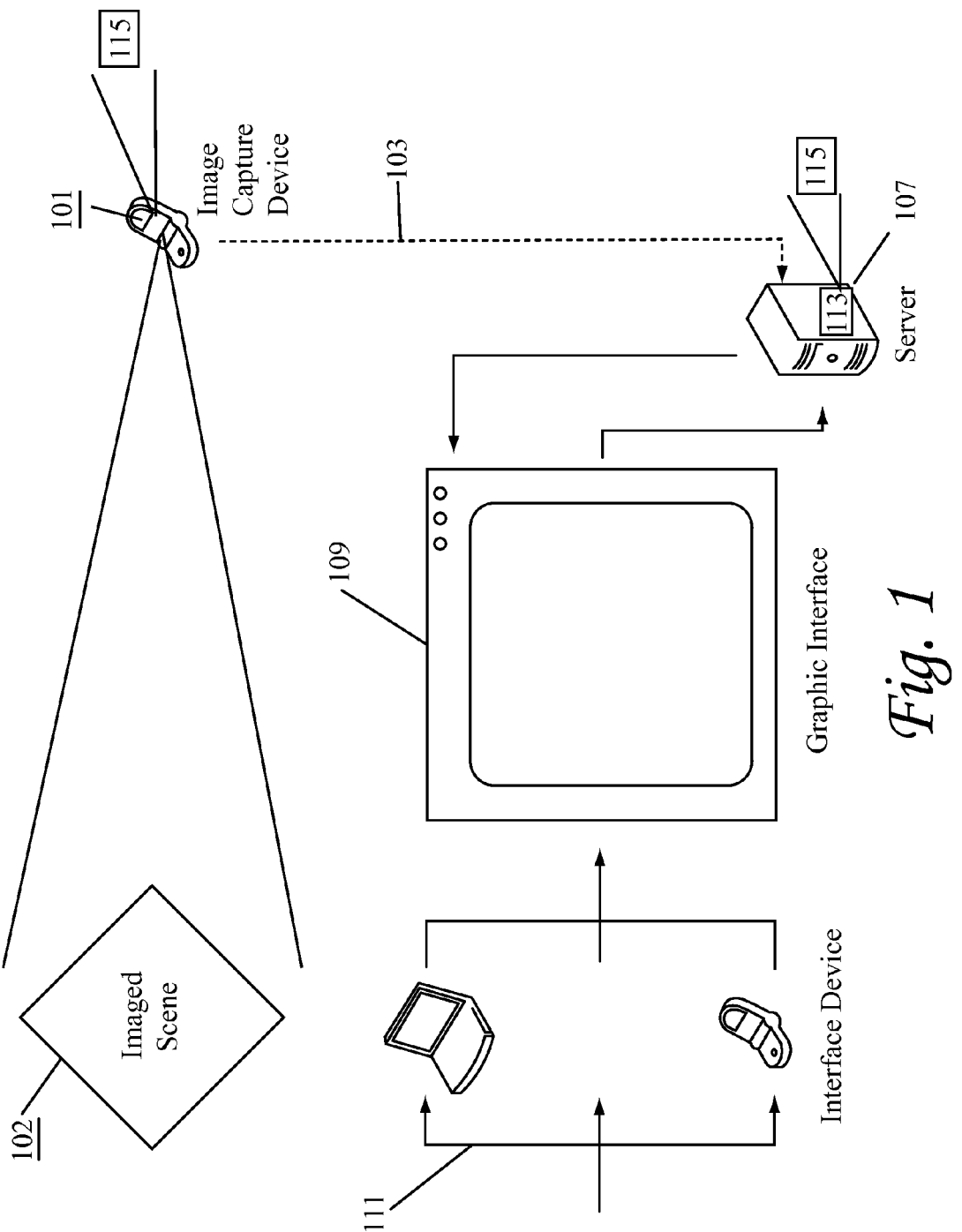
FIG. 1 shows an exemplary setting of a component for detecting text using stroke width based text detection according to one embodiment.

Exemplary Network Setting of Component for Detecting Text Using Stroke Width Based Text Detection According to Embodiments FIG. 1 shows an exemplary setting of a component 115 for detecting text using stroke width based text detection according to one embodiment. In one embodiment, component 115 can reliably detect text in images that may involve a wide variety of different fonts, colors and illumination changes because text stroke width, upon which the text detection is based, is generally constant or varies in a limited manner. In contrast, methodologies that rely on font, color or illumination can be unreliable as these characteristics can vary widely between and within images. Component 115 can execute on an image capture device (e.g., cellphone, camera) or on computer systems such as a server, desktop system, laptop etc. FIG. 1 shows image capture device 101, imaged scene 102, image 103, server 107, graphic interface 109, interface device 111, geo-information system 113 and component 115.

Referring to FIG. 1, image capture device 101 (e.g., camera-phone, camera, etc.) generates an image 103 of an imaged scene 102 (e.g., original image) that can be subjected to text detection processes such as are described in detail herein. In one embodiment, text detection can be performed on image 103 on image capture device 101 (shown as a camera-phone). Thereafter, the detected text can be identified to a user of image capture device 101. In another embodiment, text detection can be performed on image 103 on server 107. In this embodiment, image 103 can be uploaded to server 107 (such as from image capture device 101) and later can be requested by and presented to a user of geo-information system 113 for text detection thereon. In one embodiment image 103 can include but is not limited to digital representations of images of street sides and maps. In one embodiment, image 103 can include but is not limited to a natural image, an infra red image, a CT scan, a radar image, an X-Ray image, depth images, ultra sound and MRI. In one embodiment, image 103 can be based on vector data. In one embodiment, image 103 can be presented on a non-regular grid.

Server 107 supports image related services for client coupled devices such as interface device 111 (e.g., desktop computer, laptop computer, cellular phone with internet accessing capability, etc.) in embodiments that involve the uploading of image 103 to server 107. In one embodiment, server 107 can provide storage for images 103 that can be accessed for text detection purposes. In one embodiment, geo-information system 113 resides on server 107. In one embodiment, a user can access geo-information system 113 via graphic interface 109 which can be presented on interface device 111.

Figure 3A:
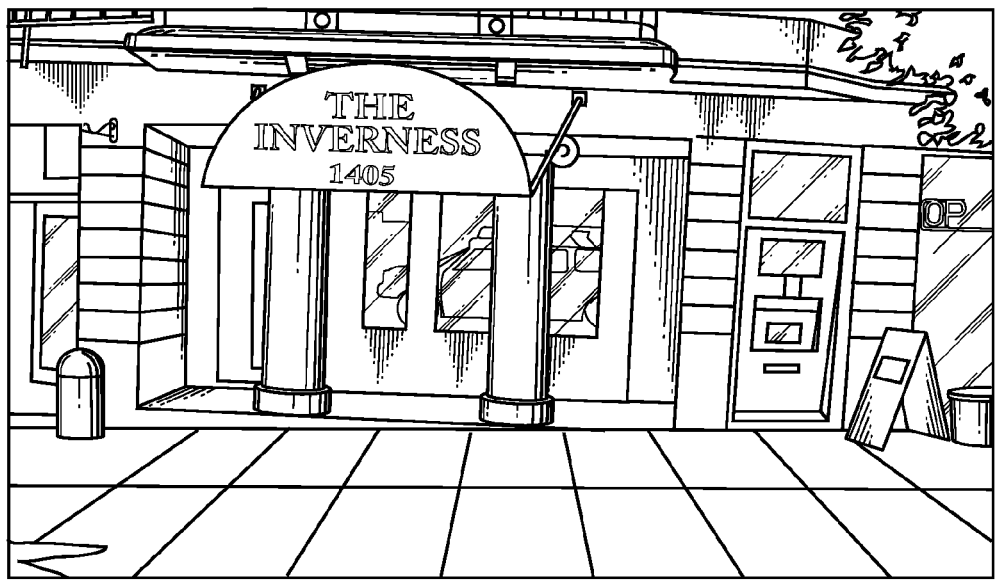
FIG. 3A shows the results of operations performed in the herein described text detection process according to one embodiment.

In the FIG. 1 embodiment, geo-information system 113 provides system users the capacity to browse images upon which text detection has or can be been performed. In one embodiment, as discussed above, system 113 can reside on server 107. In another embodiment, system 113 can reside on interface device 111. In yet another embodiment, components of system 113 can reside on server 107 and other components of system 113 can reside on interface device 111. In one embodiment, as discussed above, system 113 can be accessed through graphic interface 109 which can be associated with system 113. In one embodiment, thereby, a user can visually explore a location by browsing street sides inhabited by structures that can include but are not limited to storefronts and local business upon which text is located (see FIG. 3A and accompanying discussions below).

Component 115 directs stroke width based text detection of text in an image (e.g., 103) that is captured by image capture device 101. As discussed above, component 115 can reliably detect text in images that may involve a wide variety of different fonts, colors and illumination changes (e.g., natural images). This is because text stroke width, upon which the text detection is based, is generally constant or varies in a limited manner. In contrast, methodologies that rely on font, color or illumination can be unreliable as these characteristics can vary widely. In one embodiment, component 115 performs operations that include but are not limited to: (1) generating an image using a stroke width transform (SWT) algorithm, (2) finding letter candidates and (3) grouping letters into text lines.

In one embodiment, the stroke width transform computes a stroke width for each pixel, based on the stroke that is likely to contain the pixel, which enables sets of pixels to be associated with particular strokes based on similarity of computed stroke widths. In one embodiment, as used herein the term "stroke" is intended to refer to a contiguous part of an image that forms a band of nearly constant width. The strokes that are identified or "recovered" through operation of the stroke width transform can include both strokes that do and do not constitute text. Further processing (discussed below) allows the identification of text that can be associated therewith. The stroke width transform is described herein below in detail with reference to FIGS. 4A-4D.

In one embodiment, component 115 identifies letter candidates from the recovered strokes by: (A) identifying neighboring pixels in such strokes or "components" whose SWT ratio (ratio of computed associated stroke widths) does not exceed a predetermined threshold, (B) computing the standard deviation of recovered stroke widths associated with strokes and excluding strokes that exhibit a standard deviation that exceeds a predetermined value, (C) excluding (eliminating from further consideration) components whose aspect ratio does not fall within a predetermined range, (D) excluding components where a bounding box of the component includes more than two other components, and (E) excluding components whose height is too large or too small. In one embodiment, parameters A-E (e.g., thresholds related to stroke width ratio, variance, etc.) can be learned automatically from a sufficiently big database of images that contains text and can be set manually if the application designer so chooses. The same holds for the parameters discussed in the next paragraph.

In one embodiment, component 115 groups identified letters into text lines by determining if identified letters have: (A) similar stroke widths, (B) similar height widths, (C) similar letter widths and (D) similar space widths between identified words. Moreover, component 115 can identify individual words by using a heuristic that computes a histogram of horizontal distances between consecutive letters and estimates the distance threshold that separates intra-word letter distances from inter-word letter distance.

In one embodiment, component 115 or subcomponents thereof can be implemented on either image capture device 101 (such as a camera-phone or camera), server 107 or interface device 111 (e.g., either client or server sides of a network). In one embodiment, an input to system 113 can include but is not limited to an image 103 such as of items located on a shelf in a store or a street side panorama that includes many buildings.

Operation

Figure 2:
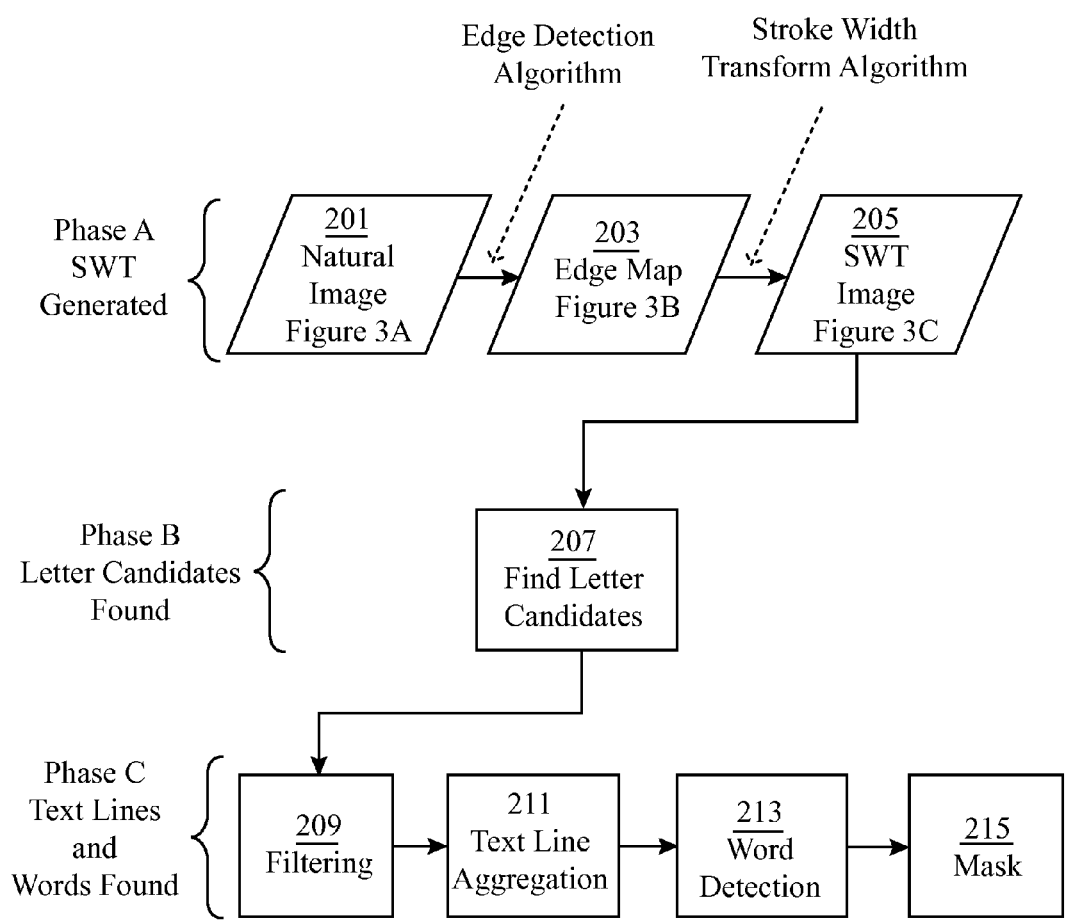
FIG. 2 shows a functional block diagram that shows the operation of a component for detecting text in a natural image based on stroke width according to one embodiment.

FIG. 2 shows a functional block diagram 200 that diagrammatically describes the operation of component 115. FIG. 2 is described below in conjunction with FIGS. 3A-3I which show pictorially the results of operations performed in phases A-C that are a part of the herein described text detection methodology according to one embodiment. It should be appreciated that the below discussed phases and operations including the order in which they are presented are only exemplary and are used for purposes of clarity and brevity. In other embodiments, other phases and operations in other orders can be used.

Generation of Stroke Width Transform

Figure 3B:
FIG. 3B shows the results of operations performed in the herein described text detection process according to one embodiment.
Figure 3C:
FIG. 3C shows the results of operations performed in the herein described text detection process according to one embodiment.

In initial phase A, a stroke width transform (SWT) image 205 is generated. As a part of the generation of SWT image 205, natural image 201 (FIG. 3A) is provided as input to an edge detection algorithm which generates edge map 203 (FIG. 3B). Then, edge map 203 is provided as input to a SWT algorithm which generates SWT image 205 (FIG. 3C).

The SWT algorithm is an image operator which computes the width of the most likely stroke that contains a pixel. Accordingly, associated stroke widths are computed for each pixel. The output of the SWT algorithm is SWT image 205 which is of size equal to the size of the input image where each pixel is associated with the width of the stroke associated with the pixel.

In one embodiment, as discussed above, a stroke is a contiguous part of an image that forms a band of a nearly constant width. Through operation of the SWT algorithm, the width of the stroke is recovered and used to identify text as described herein below.

Identifying of Letter Candidates

Figure 3D:
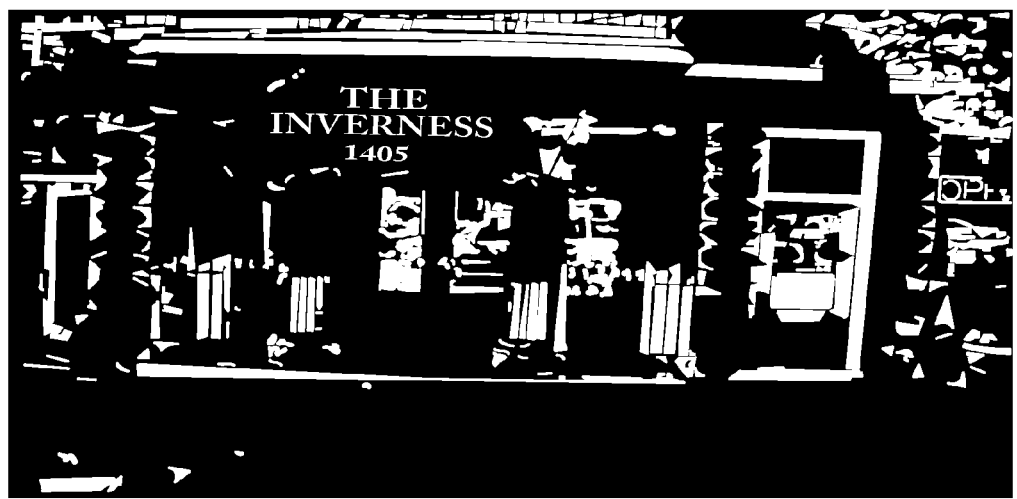
FIG. 3D shows the results of operations performed in the herein described text detection process according to one embodiment.

In intermediate phase B, SWT image 205 (FIG. 3C) is provided as input into a process for finding letter candidates 207. In one embodiment, the process for finding letter candidates 207 can employ the use of a connected component algorithm that is modified to compare values of pixels of SWT image 205. In one embodiment, the modified connected component algorithm identifies areas of pixels SWT image 205 that are associated with similar stroke widths. In one embodiment, neighboring pixels can be grouped if the ratio of their associated stroke widths does not exceed 3.0 (FIG. 3D). In other embodiments, the grouping of neighboring pixels can be based on other thresholds. In one embodiment, pixels may be considered whose stroke width is between some maximal and minimal stroke width values (parameters that depend on the size of the text that is expected to be present in a particular image). It should be appreciated that the threshold that is used is selected to ensure that strokes with smoothly varying widths can be grouped together and that process for finding letter candidates 207 does not exclude strokes that are a part of letters having elaborate fonts and perspective distortions.

Referring again to FIG. 2, after identifying "connected components" or the aforementioned areas of pixels that have similar SWT values (associated stroke widths), process for finding letter candidates 207 identifies the connected components that may contain text. Process for finding letter candidates 207 identifies connected components that may contain text by computing the standard deviation of the stroke width within each connected component and excluding the connected components that are characterized by a standard deviation that exceeds a predetermined threshold. In one embodiment, the threshold can be half the average stroke width of a particular group. In other embodiments, other thresholds can be employed.

It should be appreciated that the processes described above enable the exclusion of areas such as foliage that can be prevalent in natural images including both city and rural scenes and that can cause conventional text detecting systems to render falsely positive results. In one embodiment, foliage is readily excluded by the herein described methodology even though foliage is well known to be difficult to distinguish from text.

In addition, as discussed with reference to FIG. 1, it should be appreciated that many natural processes generate long and narrow components that can be mistaken for possible letters. In one embodiment, for selection as a possible letter, the aspect ratio of a connected component is limited to a value between 0.1 and 10. In other embodiments other aspect ratios can be employed. In addition, connected components that surround text, such as sign frames can be excluded by ensuring that the bounding box of a connected component includes not more than two other components (which is characteristic of italicized text).

In one embodiment, components whose size is outside of a predetermined range can be excluded. In one embodiment, an acceptable font height can be between 12 and 300 pixels. The utilization of such a height measure enables the detection of connected scripts, such as handwriting and Arabic fonts and accommodates words that contain letters that have been unintentionally connected due to aliasing and imperfections introduced during a preceding edge detection process (e.g., such as in Phase A discussed above). In one embodiment, letter height can be used rather than width to cut off non-text because letters can "glue" together due to edge imperfections or connected scripts. As a result, connected components of any width (up to the width of the image) can be found that contain text. Height, however, can be limited, since letters may not "glue" vertically, and vertically connected scripts can be very rare. In one embodiment, connected components that are not excluded are considered to be letter candidates that can be agglomerated into words and lines of text in the concluding phase.

Identifying Text Lines and Words

In the concluding phase C, letter candidates are subjected to processes for identifying text lines and words therefrom. Referring again to FIG. 2, in one embodiment, the processes can include but are not limited to filtering 209, text line aggregation 211, word detection 213 and masking 215. In one embodiment, because single letters may not usually appear in natural images, the identification of groups of letters, which is a function performed by filtering process 209, provides a filtering mechanism (by excluding components of the SWT that could not correspond to groups of letters). In one embodiment, text line aggregation process 211 identifies components of SWT image 205 (FIG. 3C) that appear in linear form to detect text lines because a salient characteristic of text is that it appears in a linear form. Moreover, text on a line is expected to have similarities, including similar stroke width, letter width, height and spaces between the letters and words. In one embodiment, these characteristics of text lines can be used by text line aggregation process 211 to readily identify text lines.

For example, in one embodiment a lamp post next to a car wheel would not be mistaken for the combination of letters "O" and "I" as the height of the lamp post is much greater than that of the wheel and thus the ratio of their heights would exceed a predetermined threshold. In one embodiment, each pair of letter candidates is considered for the possibility of belonging to the same text line. Two letter candidates should have similar stroke width (e.g., ratio between the averages less than two). In one embodiment, the height ratio of the letters may not exceed two (due to differences between capital and lower case letters). In one embodiment, the horizontal differences between them must not exceed three times the width of the wider one. In one embodiment, the overlap in the vertical extent must be at least 50 percent of the letter height of the smaller one. In one embodiment, this allows the algorithm to accept text with rotation up to roughly 30 degrees. In other embodiments, other thresholds can be employed.

In one embodiment, text line aggregation process 211 can construct a complete graph that contains nodes corresponding to the connected components that survive filtering process 209. Initially, every node in the graph is connected to all the others. Using the above mentioned rules, the connections between nodes that definitely can not belong to the same text line can be severed, leaving a number of connected sub-graphs where each of the connected sub-graphs is a plausible text line. They all have similar characteristics, which can be utilized for creating a binary text mask 215 that will produce better OCR results if such is needed. In one embodiment, after finding sub-graphs, the sub-graphs can be examined to identify the ones that constitute plausible text locations. For example, a single letter "A" hovering in the empty sky is not plausible. The examination can be based on a comparison of the aspect ratio of the bounding box to some threshold, and a rejection of the text line candidates that are not elongated enough to represent actual text.

Figure 3E:
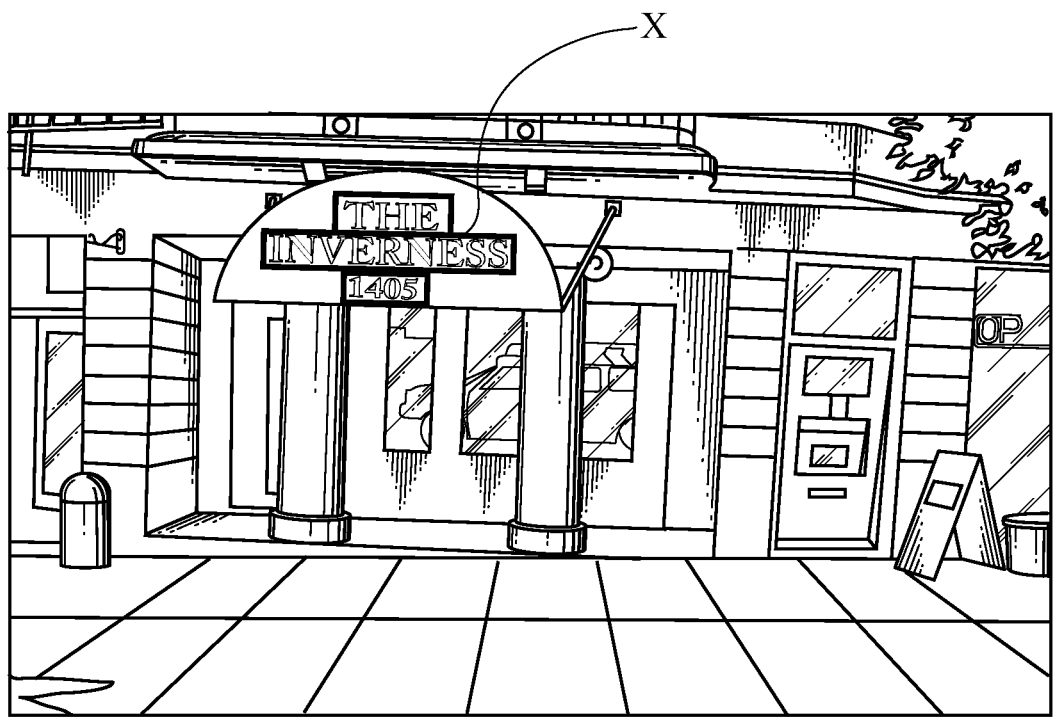
FIG. 3E shows the results of operations performed in the herein described text detection process according to one embodiment.
Figure 3F:
FIG. 3F shows the results of operations performed in the herein described text detection process according to one embodiment.
Figure 3G:
FIG. 3G shows the results of operations performed in the herein described text detection process according to one embodiment.
Figure 3H:
FIG. 3H shows the results of operations performed in the herein described text detection process according to one embodiment.
Figure 3I:
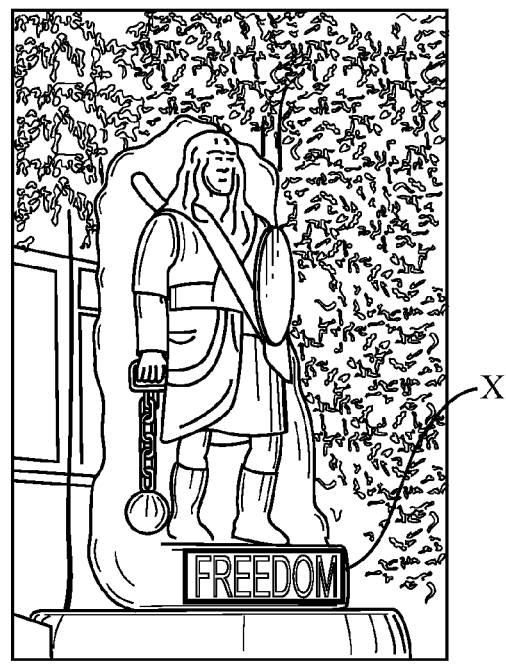
FIG. 3I shows the results of operations performed in the herein described text detection process according to one embodiment.

Referring again to FIG. 2, word detection process 213 separates text lines into separate words, using a heuristic that computes a histogram of horizontal distances between consecutive letters and estimates the distance threshold that separates intra-word letter distances from inter-word letter distance. Subsequently, with the detected text outlined as is shown in FIG. 3E (see arrow "X" pointing to outlined text). FIGS. 3F-3I pictorially summarizes the above discussed methodology relative to a natural image that includes a statue amidst significant foliage: FIG. 3F shows the original natural image 201, FIG. 3G shows the SWT image 205 after SWT processing, FIG. 3H shows the image after filtering processes (where most of the foliage and components of the statue other than text has been eliminated), and FIG. 3I which shows the detected text outlined (see arrow X pointing to outlined text). It should be appreciated that in one embodiment the word detection process may be optional. In one embodiment the text detection processes can be terminated after text lines are detected.

Additional Implementation Details of the Text Detection Methodology According to One Embodiment In the discussion below additional details related to exemplary implementations of the text detection methodology disclosed herein are discussed. As a part of the discussion, the stroke width transform (SWT) and the role that it plays in initial letter segmentation is discussed. In addition, details of an exemplary voting mechanism for selecting letter candidates and the geometric processes that are used for sifting out errors are discussed. Moreover, exemplary mechanisms for letter grouping, tests for the letter groups, and an algorithm for splitting sentences into words are discussed.

The Stroke Width Transform

In one embodiment, as discussed above, the first stage of the text detection process involves the use of an edge detection algorithm to process a natural image (e.g., 103 in FIG. 1 and 201 in FIG. 2). It should be appreciated that the particular edge detection algorithm that is used does not affect results significantly. The output of the edge detection algorithm is termed an "edge map" (see FIG. 3B). In one embodiment, the edge map is provided as input to a routine that computes a stroke width transform (see FIG. 3C). The SWT is an image of size equal to the size of the input image where each element is associated with the minimal distance between two approximately parallel edge segments that encase the element.

Figure 4A:
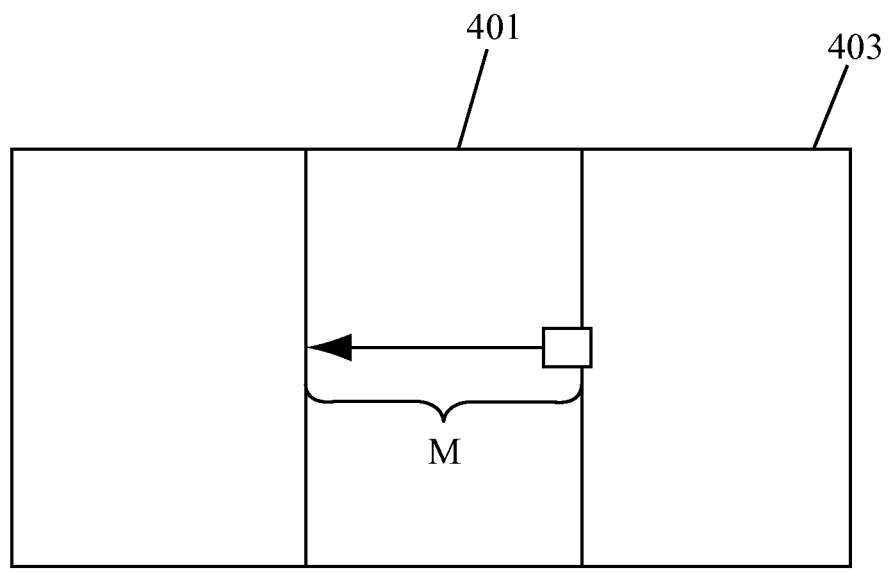
FIG. 4A shows an input image that contains a white rectangle of size M×N on a black background according to one embodiment.

For example, referring to FIG. 4A, which shows an input image I contains that contains a white rectangle 401 of size M×N (assume that M<N) on a black background 403, the matrix representing the SWT of image I will assign values M to the elements corresponding to the pixels of the white rectangle, and infinity elsewhere. In one embodiment, the text detection process can be performed twice, the second time on the inverted input image.

Figure 4B:
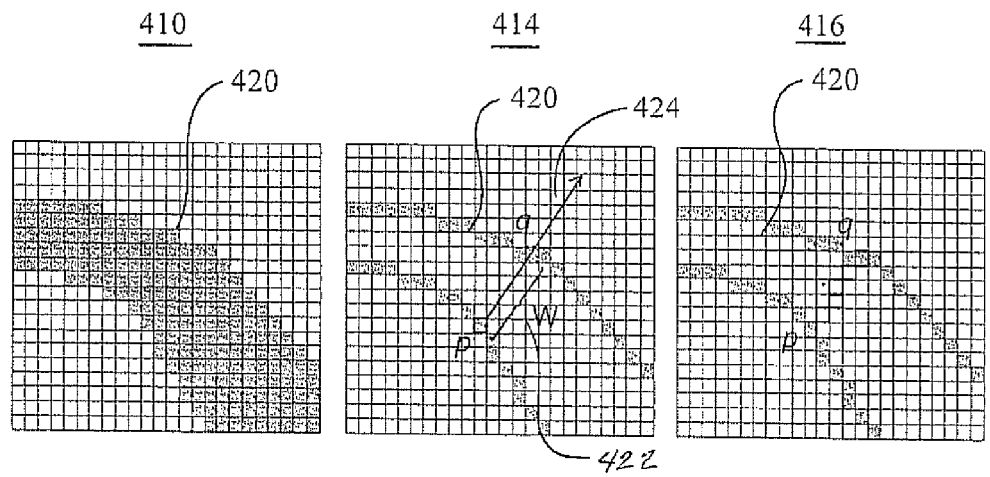
FIG. 4B shows a stroke such as from detected text according to one embodiment.

FIG. 4B shows a typical stroke 420 in frames 410, 414 and 416. It should be appreciated that pixels of strokes 420 shown in the FIG. 4B example are darker than the background pixels. Referring to FIG. 4B, pixel p is located on the edge of stroke. Directing a ray 424 in the direction of the gradient (a perpendicular direction from a first edge of a stroke to an opposing second edge of a stroke) from p leads to pixel q, which is the corresponding pixel on the opposing side of the stroke. In one embodiment, each pixel along the ray is assigned based on the minimum of its current value and the ascertained width of the stroke 422.

In order to compute a SWT (see FIG. 3C) of an input image, initially all the elements of the SWT matrix are initialized to infinity. Next, a ray is directed from each edge point p in the direction of the gradient. The ray contacts another edge point q with a roughly opposite gradient direction. In one embodiment, stroke widths up to a maximum of 70 are considered. In other embodiments, other maximal stroke widths can be used. If a matching pixel is not found the ray is discarded (e.g., not used in the computation, however, the pixels along this ray can still be assigned values by other rays, crossing those pixels from other directions). In one embodiment, each element r of the SWT matrix corresponding to the pixels along the segment [p–q] is assigned the value of min (val(r), ||p–q||), where val(r) is the previous value of the element r. In other embodiments, other formulas for assigning pixel values based on stroke width can be employed.

Figure 4C:
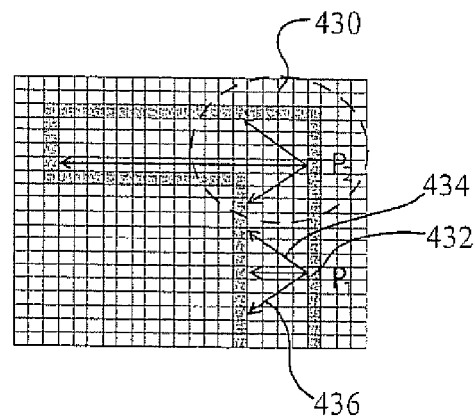
FIG. 4C shows a component of an stroke width transform (SWT) that has an L-shaped corner according to one embodiment.

In some cases, directing a single ray from an edge point can be inadequate. For example, FIG. 4C shows a component of an SWT that has an L-shaped corner. In this case, the utilization of a single ray can result in the assignment of erroneous values to the pixels near the L-shaped corner 430. In one embodiment, to address such challenges in a computationally inexpensive manner, a plurality of rays from every point: a ray with direction d 432 (the direction of the gradient at the point), and directions d+Π/4 434 and d−Π/4 436 can be used. In other embodiments, other numbers of rays can be used.

The Initial Segmentation Detection of Possible Letters (A) Pruning Out of Unreasonable Stroke Widths In one embodiment, strokes having stroke widths that are outside predetermined limits (considered to be unreasonable) are discarded. After the SWT of the edge map (see FIG. 3B) has been computed an initial segmentation is performed. All pixels that have an SWT value that is between a minimal stroke width W and maximal stroke width W are marked white and all other pixels are marked black (see FIG. 3C). More specifically, in one embodiment, pixels may be considered whose stroke width is between some maximal and minimal stroke width values (parameters that depend on the size of the text that is expected to be present in a particular image). This enables the identification of strokes that are too fine for reliable recognition or too wide to be considered valid text. The minimal and maximal stroke width are parameters that can be set a priori or learned from a learning set of images, taken, say at the streets of one city (for street side text recognition application). Next, a connected components analysis is performed on the obtained binary segmentation image (FIG. 3D). Every detected connected component is a candidate to be a letter or a group of letters from the same word considered as possibly "glued" together because of imperfections of edge detection.

(B) Pruning Out of Unreasonable Letters

In one embodiment, the herein described component for detecting text in a natural image based on a stroke width transform (e.g., 115 in FIG. 1) can apply a set of geometric tests to each identified connected component. The geometric tests can include but are not limited to test that analyze the height and aspect ratio of a bounding box of the connected component, the constancy of stroke width value in the pixels bounded by it and the relationship between its perimeter and the square root of its area. All thresholds for the geometric tests can be parameters that can be learned on a fully annotated training set. In one embodiment, the parameters can be set such that each one of them separately accepts a predetermined percentage of the connected components in the marked bounding boxes of the words on the training set. In one embodiment, the parameters can be set so that each one of them separately accepts 95% of the connected components in the marked bounding boxes of the words on the training set. In other embodiments, the parameters can be set so that each one of them separately accepts other percentages of the connected components in the marked bounding boxes of the words on the training set.

Grouping Letters Into Text Lines

It should be appreciated that in one embodiment the identified connected components can be either letters or groups of connected letters. In one embodiment possible text lines are constructed from these connected components. In one embodiment, to construct possible text lines from connected components a graph is fashioned that contains nodes that represent the connected components. Initially, the graph takes the form of an undivided representation of the connected components: every node that represents a connected component is connected to all the others. Subsequently, the connections between nodes that are strongly implicated as not belonging to the same text line are severed. The criteria for this decision can include but are not limited to: (1) distance in the vertical direction (text lines are assumed to be approximately horizontal), (2) amount of intersection in the horizontal direction (edges between connected components that overlap too much or are too far apart are eliminated), (3) the difference in average stroke width between connected components (e.g., connected components in the same text line should have similar average stroke width value).

In one embodiment, after the severing of connections between nodes that do not belong to the same text line is completed, the connected sub-graphs in the graph are identified. In one embodiment, each sub-graph in the graph can correspond to a separate text line, and bounding boxes for each sub-graph are computed. As discussed above, in one embodiment, after finding sub-graphs, the sub-graphs can be examined to determine which ones can be plausible text locations. In one embodiment, the examination of sub-graphs can be based on a comparison of the aspect ratio of the bounding box to some threshold, where the text line candidates that are not elongated enough to represent actual text are rejected.

Separating Lines Into Words

Finally, the component for detecting text in a natural image based on a stroke width transform (e.g., 115 in FIG. 1) separates text lines into separate words, using a simple heuristic that computes a histogram of horizontal distances between consecutive letters and estimates the distance threshold that separates intra-word letter distances from inter-word letter distances.

It should be appreciated that exemplary embodiments can be employed in the detection of business signs in terrestrial images and in the identification of text areas in natural images undergoing mosaicing to facilitate the avoidance of texture mosaicing in identified text areas. In addition, embodiments can be employed in performing image searches and in the identification of products in shops images.

Figure 5:
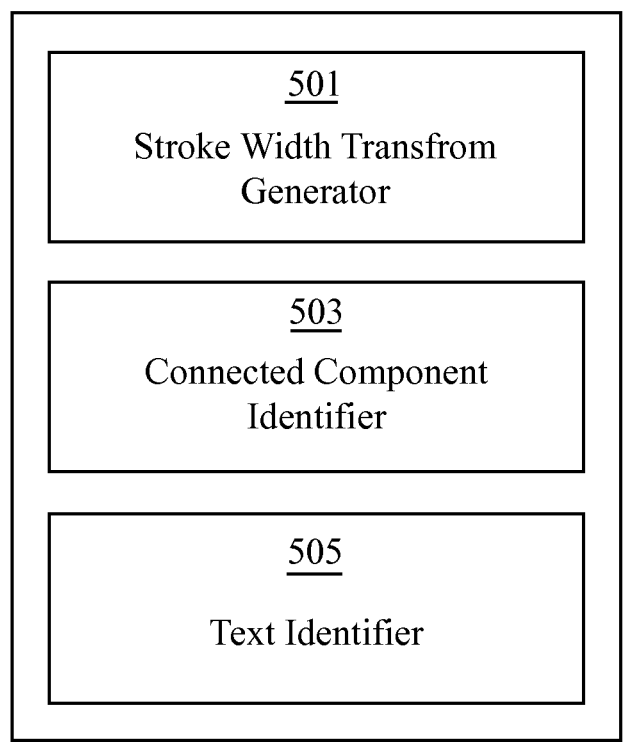
FIG. 5 shows subcomponents of a component for detecting text in a natural image based on a stroke width transform according to one embodiment.

Component for Detecting Text Using Stroke Width Based Text Detection According to Embodiments FIG. 5 shows subcomponents of a component 115 for detecting text in a natural image using stroke width based text detection according to one embodiment. In one embodiment, component 115 implements an algorithm for detecting text in an image based on a stroke width transform. In the FIG. 2 embodiment, component 115 includes stroke width transform generator 501, connected component identifier 503 and text identifier 505.

It should be appreciated that aforementioned subcomponents of component 115 can be implemented in hardware or software or in a combination of both. In one embodiment, components and operations of component 115 can be encompassed by components and operations of one or more computer programs (e.g. program on board a server or interface device). In another embodiment, components and operations of component 115 can be separate from the aforementioned one or more computer programs but can operate cooperatively with components and operations thereof.

Referring to FIG. 5, stroke width transform generator 501 generates stroke width transforms of images. In one embodiment, stroke width transform generator 501 generates the stroke width transforms based on an edge map of an image that is provided as input. In one embodiment, the stroke width transform is a representation of the image that includes elements that are associated with identified image components or strokes that have stroke widths that can be determined.

Connected component identifier 503 identifies connected components from the generated stroke width transforms. In one embodiment, connected component identifier 503 filters out elements of the aforementioned stroke width transform by using predetermined metrics related to stroke width to exclude the elements and to identify connected components. These metrics are discussed herein in detail with reference to FIG. 1 and FIG. 2.

Text identifier 505 identifies text in an accessed image based on the aforementioned connected components. In one embodiment, to construct possible text lines from connected components identified by connected component identifier 503 a graph is built that contains nodes that represent the connected components. Initially, the graph is an intact string of nodes: every node is connected to all the others. After that, the connections between nodes that are identified as not belong to the same text line are severed. The criteria for this decision can include but is not limited to: (1) distance in the vertical direction (text lines are assumed to be approximately horizontal), (2) amount of intersection in the horizontal direction (edges between connected components that overlap too much or are too far apart are cut), (3) the difference in average stroke width between connected components (e.g., connected components in the same text line should have similar average stroke width value).

In one embodiment, after the severing of connections between nodes that do not belong to the same text line has been completed, text identifier 505 marks the connected subgraphs in the graph. In one embodiment, each sub-graph in the graph corresponds to a separate text line, and the bounding boxes for each sub-graph are computed. Moreover, as described in detail herein text identifier 505 can separate text lines into separate words, using a simple heuristic that computes a histogram of horizontal distances between consecutive letters and estimates the distance threshold that separates intra-word letter distances from inter-word letter distances.

Figure 6:
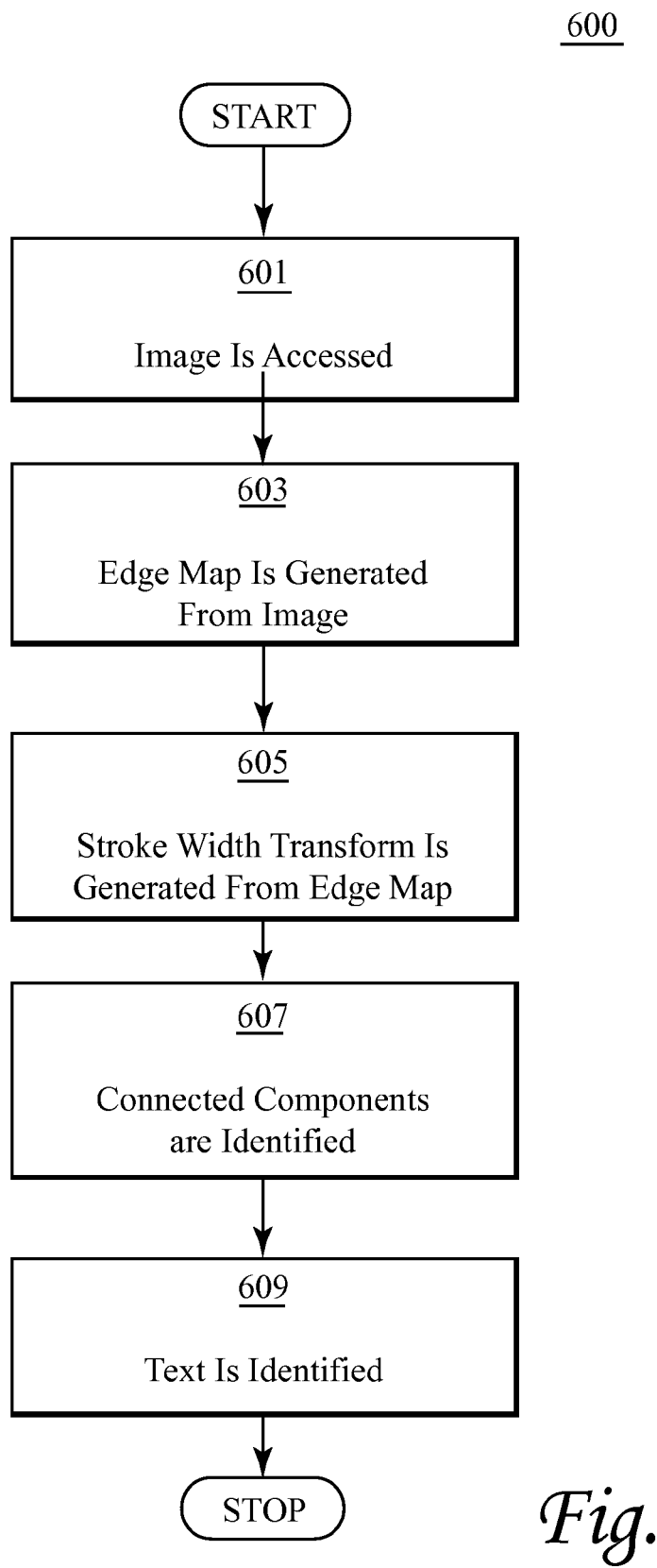
FIG. 6 shows a flowchart of the steps performed in a method for detecting text using stroke width based text detection according to one embodiment.

Exemplary Operations of Method for Detecting Text Using Stroke Width Based Text Detection According to Embodiments FIG. 6 shows a flowchart 600 of the steps performed in a method for detecting text using stroke width based text detection according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 6, at 601 an image (e.g., a natural image, etc.) is accessed. In one embodiment the image can be accessed from camera-phone data storage or from a server such as in conjunction with the operation of a geo-information system.

At 603, an edge map is generated from the image accessed at 601. In one embodiment, the edge map is generated using an edge detection algorithm.

At 605, a stroke width transform is generated from the edge map. In one embodiment, stroke width transform generator 501 generates the stroke width transforms based on an edge map of an image that is provided as input. In one embodiment, the stroke width transform is a representation of the image that includes elements that are associated with strokes with stroke widths that can be recovered.

At 607, connected components are identified. In one embodiment, connected component identifier 503 filters out elements of the aforementioned stroke width by using predetermined metrics related to stroke width to exclude the elements and to identify connected components. These metrics are discussed herein in detail with reference to FIG. 1 and FIG. 2.

At 609, text is identified from connected components. In one embodiment, possible text lines from connected components can be identified using a graph that contains nodes that represent the connected components. In one embodiment, text lines can be separated into separate words, using a simple heuristic that computes a histogram of horizontal distances between consecutive letters and estimates the distance threshold that separates intra-word letter distances from inter-word letter distances.

It should be appreciated that exemplary embodiments present a fast and reliable text detector, that is tolerant to a wide range of different fonts, colors, and illumination changes that exist In images such as natural images. Moreover, exemplary embodiments, take advantage of fact that fonts tend to have a constant or a limited varying stroke width, which facilitates the distinguishing of text from other objects in the image, such as vegetation.

Figure 7:
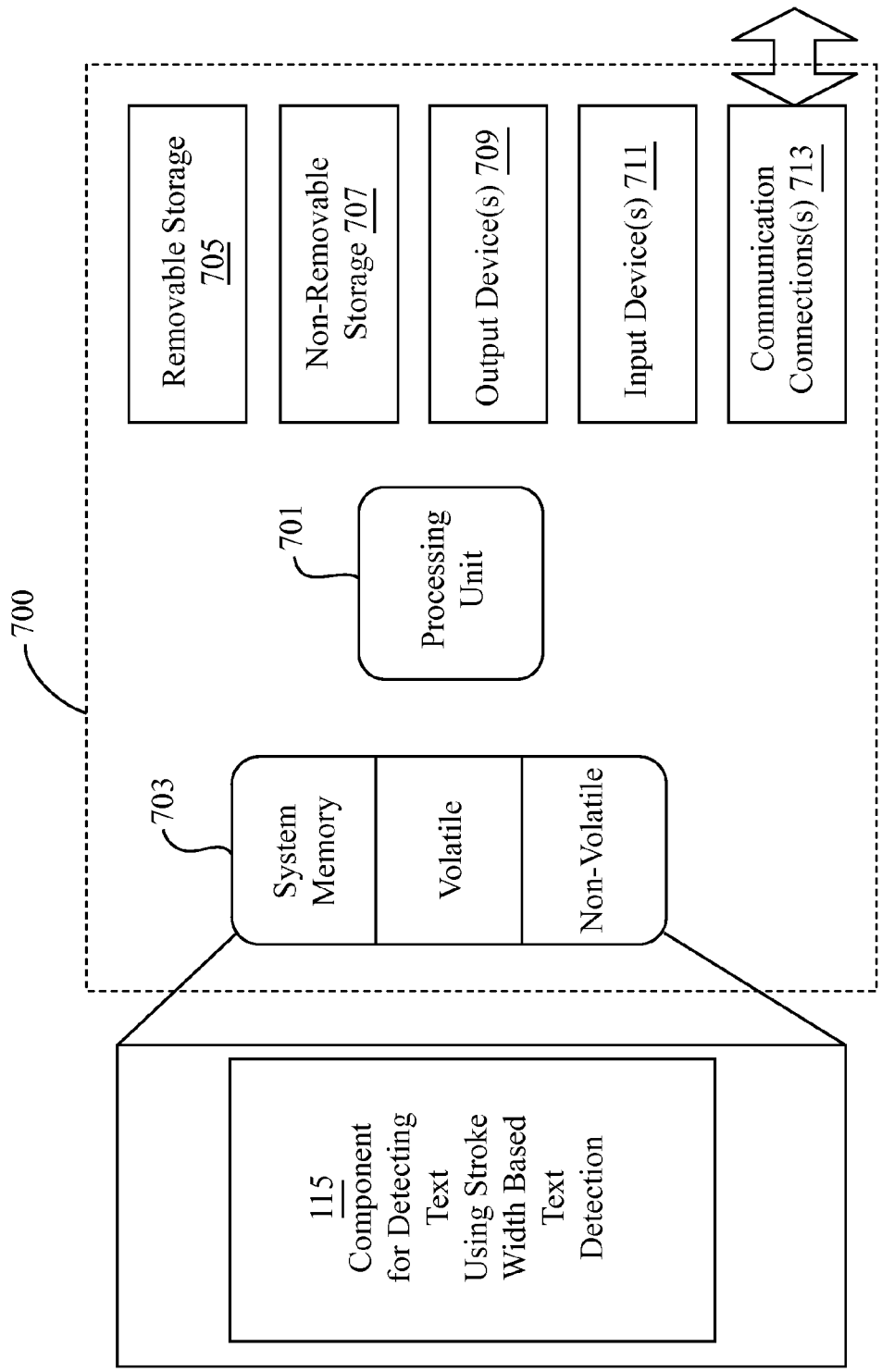
FIG. 7 shows an exemplary computing device according to one embodiment.

Exemplary Hardware Operating Environment of Component for Detecting Text Using Stroke Width Based Text Detection According to One Embodiment FIG. 7 shows an exemplary computing device 700 according to one embodiment. Referring to FIG. 7, computing device 700 can be included as a part of a server (e.g., server 107 in FIG. 1) and/or an interface device (interface device 111 in FIG. 1) in accordance with one embodiment. Computing device 700 typically includes at least some form of computer readable media. Computer readable media can be any available media that can be accessed by computing device 700 and can include but is not limited to computer storage media.

In its most basic configuration, computing device 700 typically includes processing unit 701 and system memory 703. Depending on the exact configuration and type of computing device 700 that is used, system memory 703 can include volatile (such as RAM) and non-volatile (such as ROM, flash memory, etc.) elements or some combination of the two. In one embodiment, as shown in FIG. 7, a text detection component 115 (see description of component 115 for detecting text based on stroke width made with reference to FIG. 1) can reside in system memory 703.

Additionally, computing device 700, especially the version that can be a part of server 107 in FIG. 1, can include mass storage systems (removable 705 and/or non-removable 707) such as magnetic or optical disks or tape. Similarly, computing device 700 can include input devices 711 and/or output devices 709 (e.g., such as a display). Additionally, computing device 700 can include network connections 713 to other devices, computers, networks, servers, etc. using either wired or wireless media. As all of these devices are well known in the art, they need not be discussed in detail.

With reference to exemplary embodiments thereof, detecting text using stroke width based text detection is disclosed. As a part of the text detection, a representation of an image is generated that includes pixels that are associated with the stroke widths of components of the image. Connected components of the image are identified by filtering out portions of the pixels using metrics related to stroke width. Text is detected in the image based on the identified connected components.

The foregoing descriptions of specific embodiments have been presented for purposes of illustration and description. They are not intended to be exhaustive or to limit the subject matter to the precise forms disclosed, and obviously many modifications and variations are possible in light of the above teaching. The embodiments were chosen and described in order to best explain the principles of the disclosed subject matter and its practical application, to thereby enable others skilled in the art to best utilize the disclosed subject matter and various embodiments with various modifications as are suited to the particular use contemplated. It is intended that the scope of the disclosed subject matter be defined by the Claims appended hereto and their equivalents.

What is claimed is:

1. A method for detecting text using stroke width based text detection, comprising:
   generating a representation of an image taken from an imaged scene that includes pixels that are associated with stroke widths of components of said image;
   identifying connected components of said image by filtering out portions of said pixels using metrics related to stroke width to exclude said portions of said pixels; and
   detecting text in said image by building a graph that contains nodes that represent identified connected components,
   wherein, initially, said graph is an intact string of nodes in which each node is connected to all other nodes, and
   wherein connections between nodes that are identified as not belonging to a same text line are severed, based on:
   distance in a vertical direction;
   an amount of intersection in a horizontal direction; and
   a difference in average stroke width between connected components.

2. The method of claim 1, wherein said image is selected from the group that includes natural image, infra red image, CT scan and radar.

3. The method of claim 2, wherein said image is based on vector data.

4. The method of claim 2, wherein said image is presented on a non-regular grid.

5. The method of claim 1, wherein said filtering comprises eliminating components that cannot be recognized or are not considered associated with valid text.

6. The method of claim 1, wherein said filtering comprises determining whether adjacent pixels are associated with the same stroke width.

7. The method of claim 1, wherein said filtering comprises eliminating components with an associated stroke width whose standard deviation exceeds a predetermined threshold.

8. A method of associating pixels with the width of image components for detecting text in images, comprising:
   determining image components of an image taken from an imaged scene that are characterized by opposing elements;
   projecting lines between said opposing elements on both sides of a stroke;
   associating pixels along said lines with widths of particular image components;
   identifying connected components of said image by filtering out portions of said pixels using metrics related to the widths of said particular image components to exclude said portions of said pixels; and
   detecting text in said image based on identified connected components by building a multi-nodal graph that is, initially, a string of nodes in which each node is connected to all other nodes and in which connections between nodes that are identified as not belonging to a same line of text are severed.

9. The method of claim 8, wherein said opposing elements on both sides of a stroke are represented by edges in said image.

10. The method of claim 8, wherein said image is selected from the group consisting of natural image, infra red image, CT scan, radar, depth image, MRI, X-Ray and UltraSound.

11. The method of claim 8, wherein said image is based on vector data.

12. The method of claim 8, wherein said image is presented on a non-regular grid.

13. The method of claim 8, wherein said filtering comprises eliminating components that cannot be recognized or that are not considered to be associated with valid text.

14. The method of claim 8, wherein said filtering comprises determining whether adjacent pixels are associated with the same stroke width.

15. The method of claim 8, wherein said filtering comprises eliminating components with an associated stroke width whose standard deviation exceeds a predetermined threshold.

16. The method of claim 8, wherein the connections between nodes that are identified as not belonging to a same line of text are severed based on a distance in a vertical direction.

17. The method of claim 16, wherein the connections between nodes that are identified as not belonging to a same line of text are severed based on an amount of intersection in a horizontal direction.

18. The method of claim 17, wherein the connections between nodes that are identified as not belonging to a same line of text are severed based on a difference in average stroke width between connected components.

19. A computer usable storage device encoded with processing instructions that, when executed, cause the execution of a method comprising:
   generating a representation of an image taken from an imaged scene that includes elements that are associated with the stroke widths of components of said image;
   identifying connected components of said image by filtering out portions of said elements using metrics related to stroke width to exclude said portions of said elements; and
   detecting text in said image based on said identifying said connected components by building a graph that contains nodes that represent identified connected components,
   wherein, initially, said graph is an intact string of nodes in which each node is connected to all other nodes, and
   wherein connections between nodes that are identified as not belonging to a same text line are severed, based on:
   distance in a vertical direction;
   an amount of intersection in a horizontal direction; and
   a difference in average stroke width between connected components.

20. The device of claim 19, wherein said image is selected from the group that includes a natural image, an infra red image, a CT scan, a depth image, an UltraSound, MRI, and radar.

21. The device of claim 19, wherein said image is based on vector data.

22. The device of claim 19, wherein said image is presented on a non-regular grid.

23. The device of claim 19, wherein said filtering comprises determining whether adjacent elements are associated with the same stroke width.

24. The device of claim 19, wherein the stroke width is a distance between a pixel at a first edge of a stroke and a second pixel at an opposing edge of the stroke, the pixels being mutually located so that a ray in a direction of a gradient from one pixel leads to the other pixel.

* * * * *